US012739287B2

(12) United States Patent
Wang et al.

(10) Patent No.: US 12,739,287 B2
(45) Date of Patent: Sep. 15, 2026

(54) IMPROVING VOICE OVER INTERNET PROTOCOL (VoIP) CALL SETUP SUCCESS RATE AND LATENCY

(71) Applicant: QUALCOMM Incorporated, San Diego, CA (US)

(72) Inventors: Shuhong Wang, Shanghai (CN); Bing Leng, Shanghai (CN); Jing Zhou, Shanghai (CN); Jian Li, Shanghai (CN); Xuefeng Chen, Shanghai (CN); Yan Wang, Shanghai (CN); Hao Zhang, Shanghai (CN)

(73) Assignee: QUALCOMM Incorporated, San Diego, CA (US)

(*) Notice: Subject to any disclaimer, the term of this patent is extended or adjusted under 35 U.S.C. 154(b) by 284 days.

(21) Appl. No.: 18/553,726

(22) PCT Filed: Jun. 7, 2021

(86) PCT No.: PCT/CN2021/098575
§ 371 (c)(1),
(2) Date: Oct. 2, 2023

(87) PCT Pub. No.: WO2022/256961
PCT Pub. Date: Dec. 15, 2022

(65) Prior Publication Data

US 2024/0187458 A1 Jun. 6, 2024

(51) Int. Cl.
*H04L 12/66* (2006.01)
*H04L 65/1016* (2022.01)
(Continued)

(52) U.S. Cl.
CPC ...... *H04L 65/1016* (2013.01); *H04L 65/1069* (2013.01); *H04W 76/18* (2018.02)

(58) Field of Classification Search
CPC ............ H04L 65/1069; H04L 65/1096; H04L 63/1408; H04L 63/10; H04L 43/0852;
(Continued)

(56) References Cited

U.S. PATENT DOCUMENTS 10,327,277 B2 6/2019 Kim et al.
2010/0161745 A1* 6/2010 Yamazaki ............ H04L 67/563 709/227
(Continued)

OTHER PUBLICATIONS

Holmberg Ericson C, Indication of Support for Keep-Alive; Indication of Support for Keep-Alive; Internet Engineering Task Force, IETF, Standard Internet Society (ISOC) 4, Rue Des Falaises CH-1205 Geneva Switzerland, Apr. 11, 2011, pp. 1-18 (Year: 2011).*
(Continued)

*Primary Examiner* — Kharye Pope
(74) *Attorney, Agent, or Firm* — Seyfarth Shaw LLP

(57) ABSTRACT

A method and apparatus improve Voice over Internet Protocol (VoIP) call setup success rate and latency. The method provides for attempting a mobile originated packet switched call, by a user equipment (UE), across a packet switched network with a transmission control protocol (TCP) connection of the Internet Protocol multimedia subsystem (IMS) session. A silent redial of the mobile originated packet switched call is performed in response to a failure of the mobile originated packet switched call, via a circuit switched network. A keep alive message is transmitted over the packet switched network after the circuit switched network call, which allows reconnection to the packet switched network.

21 Claims, 5 Drawing Sheets

(51) Int. Cl.
*H04L 65/1069* (2022.01)
*H04W 76/18* (2018.01)

(58) Field of Classification Search
CPC ... H04L 69/165; H04L 43/10; H04L 65/1016; H04L 63/18; H04W 76/19; H04W 76/25; H04W 76/18; H04W 65/1069
See application file for complete search history.

(56) References Cited

U.S. PATENT DOCUMENTS

| | | | | |
|---|---|---|---|---|
| 2015/0201454 | A1 | 7/2015 | Shukair et al. | |
| 2016/0353344 | A1* | 12/2016 | Deivasigamani ....... | H04W 4/24 |
| 2017/0181215 | A1* | 6/2017 | Gaur ....................... | H04L 69/40 |
| 2017/0353505 | A1 | 12/2017 | Nomani et al. | |
| 2018/0132291 | A1 | 5/2018 | Kalepu et al. | |
| 2023/0319189 | A1* | 10/2023 | Gong .................. | H04M 7/0075<br>370/259 |

OTHER PUBLICATIONS

Holmberg (Ericsson) C., "Indication of Support for Keep-Alive, rfc6223.txt", Indication of Support for Keep-Alive, RFC6223.TXT, Internet Engineering Task Force, IETF, Standard, Internet Society (ISOC) 4, Rue Des Falaises Ch-1205, Geneva, Switzerland, Apr. 11, 2011 (Apr. 11, 2011), pp. 1-18, XP015075966, [retrieved on Apr. 11, 2011] paragraph [0053]-paragraph [0054].

International Search Report and Written Opinion—PCT/CN2021/098575—ISA/EPO—Dec. 8, 2021.

* cited by examiner

IMPROVING VOICE OVER INTERNET PROTOCOL (VoIP) CALL SETUP SUCCESS RATE AND LATENCY

FIELD OF THE DISCLOSURE

Aspects of the present disclosure generally relate to wireless communications, and more particularly to techniques and apparatuses for improving Voice over Internet Protocol (VoIP) call setup success rates and call latency.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communication systems may include or provide support for various communication systems, including Voice over Internet Protocol (VoIP). In some examples, digital information may be packetized and transmitted as Internet Protocol (IP) packets over a packet switched (PS) network in a VoIP call. In contrast, a circuit switched (CS) network establishes a dedicated communication circuit, or channel, between two communication nodes, such as two user equipment (UEs), before communication occurs. Most UEs transition between VoIP operation (e.g., PS operation) and CS operation as needed.

SUMMARY

Aspects of the disclosure include a method of wireless communication. The method includes attempting a mobile originated packet switched call across a packet switched network with a first transmission control protocol (TCP) connection of an Internet Protocol multimedia subsystem (IMS) session. The method also includes performing a silent redial of the mobile originated packet switched call via a circuit switched network, in response to a failure of the mobile originated packet switched call. The method concludes with transmitting a keep alive message over the packet switched network after terminating the circuit switched network call and reconnecting to the packet switched network.

Further aspects of the disclosure provide an apparatus for wireless communication by a user equipment (UE). The apparatus provides a memory with at least one processor connected to the memory. Instructions are stored in the memory and when executed by the processor cause the apparatus to attempt a mobile originated voice over Internet Protocol (VoIP) call across a packet switched network with a first transmission control protocol (TCP) connection of the Internet Protocol multimedia subsystem (IMS) session. The instructions also cause the processor to perform a silent redial of the mobile originated packet switched call via a circuit switched network, in response to a failure of the mobile originated packet switch call and also to transmit a keep alive message over the packet switched network after terminating the circuit switched network call and reconnecting to the packet switched network.

Still further aspects of the disclosure provide an apparatus for wireless communication by a user equipment (UE). The apparatus comprises means for attempting a mobile originated packet switched call across a packet switched network with a first transmission control protocol (TCP) connection of an Internet Protocol multimedia subsystem (IMS session. The apparatus also comprises means for performing a silent redial of the mobile originated packet switched call via a circuit switched network, in response to a failure of the mobile originated packet switched call. In addition, the apparatus also comprises means for transmitting a keep alive message over the packet switched network after terminating the circuit switched network call and reconnecting to the packet switched network.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
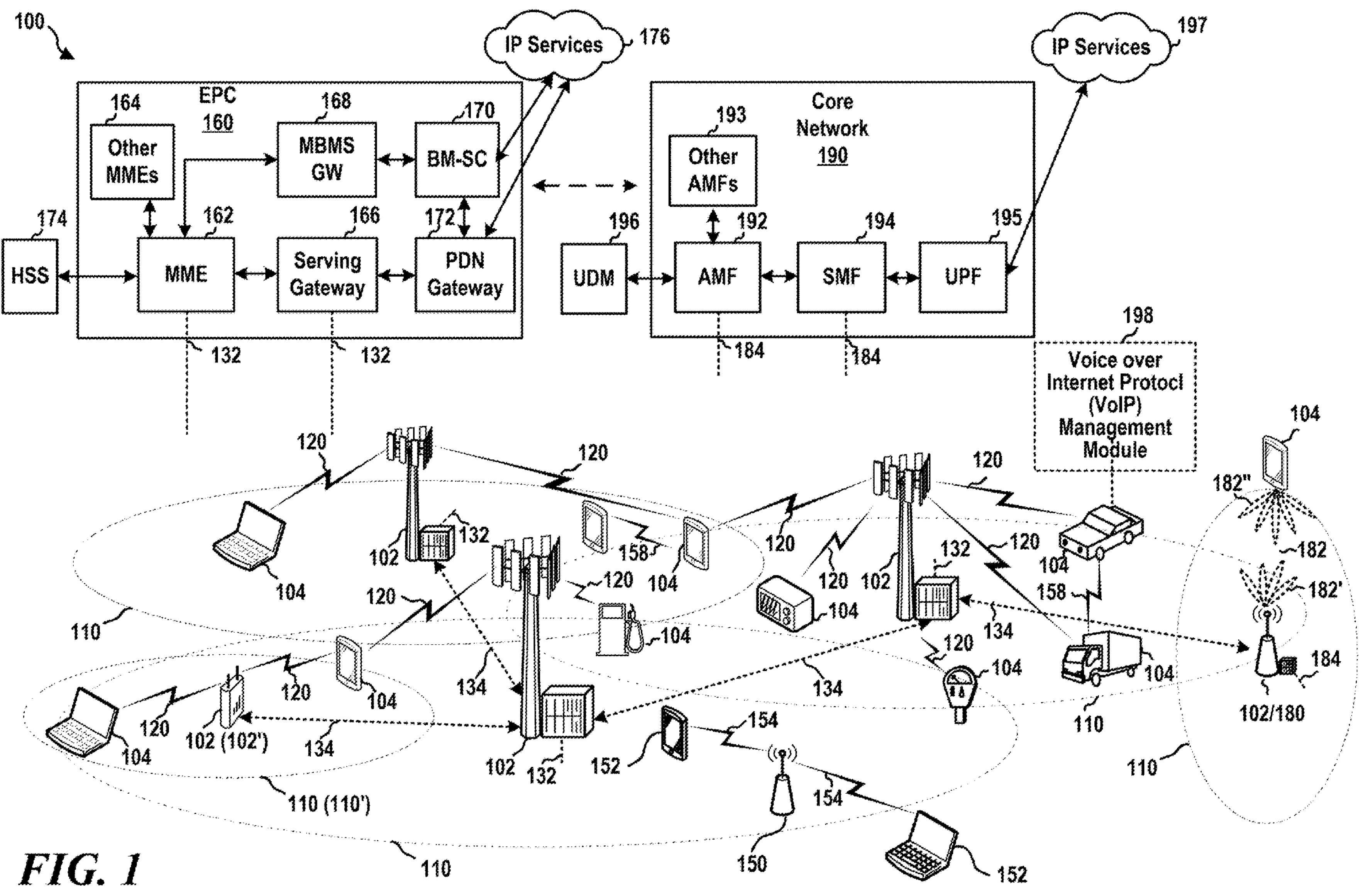
FIG. 1 is a diagram illustrating an example of a wireless communications system and an access network.

Various aspects of the present disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the present disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the present disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication systems may include or provide support for various communications systems, including Voice over Internet Protocol (VoIP). In some examples, digital information may be packetized and transmitted as Internet Protocol (IP) packets over a packet switched (PS) network in a VoIP call. In contrast, a circuit switched (CS) network establishes a dedicated communication circuit, or channel, between two communication nodes, such as two user equipment (UEs), before communication occurs. In some examples, a UE transitions between VoIP operation (e.g., PS operation) and CS operation as needed.

In most cases, the transition between VoIP operation and CS operation is seamless. Still, in some cases, a UE may initiate a VoIP call by transmitting an initial session initiation protocol (SIP) invite message. In such cases, the UE may fail to receive a response to the SIP invite message from the network. Additionally, in such cases, after a period of time, a VoIP call setup (Tcall) timer expires and the UE performs a silent redial. During a silent redial, a UE repeatedly dials a number without indicating the dialing to a user. Silent redials may occur when the UE is out-of-sync with the network. This out-of-sync condition may cause the UE to repeatedly perform silent redials, thereby delaying the call setup. It may be desirable to improve VoIP call setup latency and success rate.

In a VoIP call, channel setup, digitization of analog voice signals, and encoding may be performed similarly to conventional digital telephony. That is, digital information may be packetized and the packets may be transmitted as Internet Protocol (IP) packets over a packet switched network. Media streams may also be transported over IP using protocols for encoding audio and video with audio codecs and video codecs.

A VoIP call begins when a UE sends an initial session initiation protocol (SIP) invite to another VoIP enabled device using the packet switched network. The VoIP enabled device may be one of a UE, a computer, tablet, network interface to a telephone switch circuit, or another device capable of accessing the packet switched network and providing an audio interface. That is, a SIP invite request is an example of a message sent by a calling party inviting a recipient to a VoIP session. The packet switched network directs the SIP invite to the called UE (e.g., the recipient). The calling UE expects to receive a radio link control (RLC) acknowledgement (ACK) from the base station (e.g., gNode/eNodeB). The base station may expect to receive a transmission control protocol (TCP) ACK from a proxy call session control function (P-CSCF) to indicate the VoIP call has been established. However, in some instances, the base station may fail to receive the TCP ACK or the P-CSCF may fail to transmit the TCP ACK. In such instances, the UE may retransmit the initial SIP invite until the call timer (Tcall) expires. Once the Tcall timer expires, the UE attempts to complete the call by performing a silent redial to the CS.

In some examples, the calling UE may continue to perform silent redials to the CS because the calling UE has not received a TCP keep alive message or a TCP reset (TCP RST) message from the packet switched network. At this point, the UE is still operating on the previous TCP connection to the packet switched network, which may cause an out of sync condition for the TCP connection between the UE and P-CSCF. Thus, the issue repeats with each successive silent redial. That is, when the first VoIP call performs a silent redial to the CS network, subsequent calls also perform silent redials to the CS network.

The successive silent redials may be indicative of an out-of-sync issue between the calling UE and the packet switched network. The TCP connection may be in linger status or may be torn down at any one of the network elements, such as the radio access network (RAN), packet data network (PDN) gateway with the P-CSCF. In some examples, the VoIP call may fail because the calling UE was not timely notified that the base station (e.g., gNodeB or eNodeB) did not receive the TCP keep alive message.

Aspects of the present disclosure are directed to improving VoIP call setup latency and success rate. In some aspects, a UE includes a VoIP management to cause the UE, or one or more components of the UE, to actively send a TCP keep alive message to the base station when transitioning from the circuit switched network to the packet switched network. If the UE fails to receive a response to the TCP keep alive message, the UE may attempt to re-establish the TCP connection with an initial P-CSCF. In such examples, if the UE may still fail to receive a response from the initial P-CSCF after attempting TCP re-establishment, the UE may try an another P-CSCF address and trigger the IP multimedia subsystem (IMS) re-registration process. Finally, the UE may release the IP multimedia subsystem packet data network (IMS PDN) if the UE fails to receive a response after attempting all available P-CSCFs. After releasing the IMS PDN, the UE may attempt to re-establish an IMS PDN connection to acquire a new IP address and a new P-CSCF address.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the evolved packet core (EPC) 160 through backhaul links 132 (e.g., SI interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL, WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth®, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mm Wave or near mm Wave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mm Wave/near mmWave radio frequency band (e.g., 3 GHz to 300 GHz) has extremely high path loss and a short range. The mm Wave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The evolved packet core (EPC) 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QOS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a mobile device, such as the user equipment (UE) 104, may include a voice over Internet Protocol (VoIP) management module 198 configured to improve VoIP call setup latency and success rate. The VoIP management module 198 may also assist with transmitting a transmission control protocol (TCP) keep alive message when transitioning from a circuit switched (CS) network to a packet switched (PS) network, re-establishing a TCP session with an initial proxy call session control function (P-CSCF), trying a next P-CSCF to re-establish the TCP session, releasing the Internet Protocol multimedia subsystem (IMS) packet data network (PDN), and finally re-establishing the IMS PDN to acquire a new IP address and a new P-CSCF address, as described below.

Although the following description may be focused on 5G NR, it may be applicable to other similar areas, such as LTE, LTE-A, CDMA, GSM, and other wireless technologies.

Figures 2A, 2B, 2C, 2D:
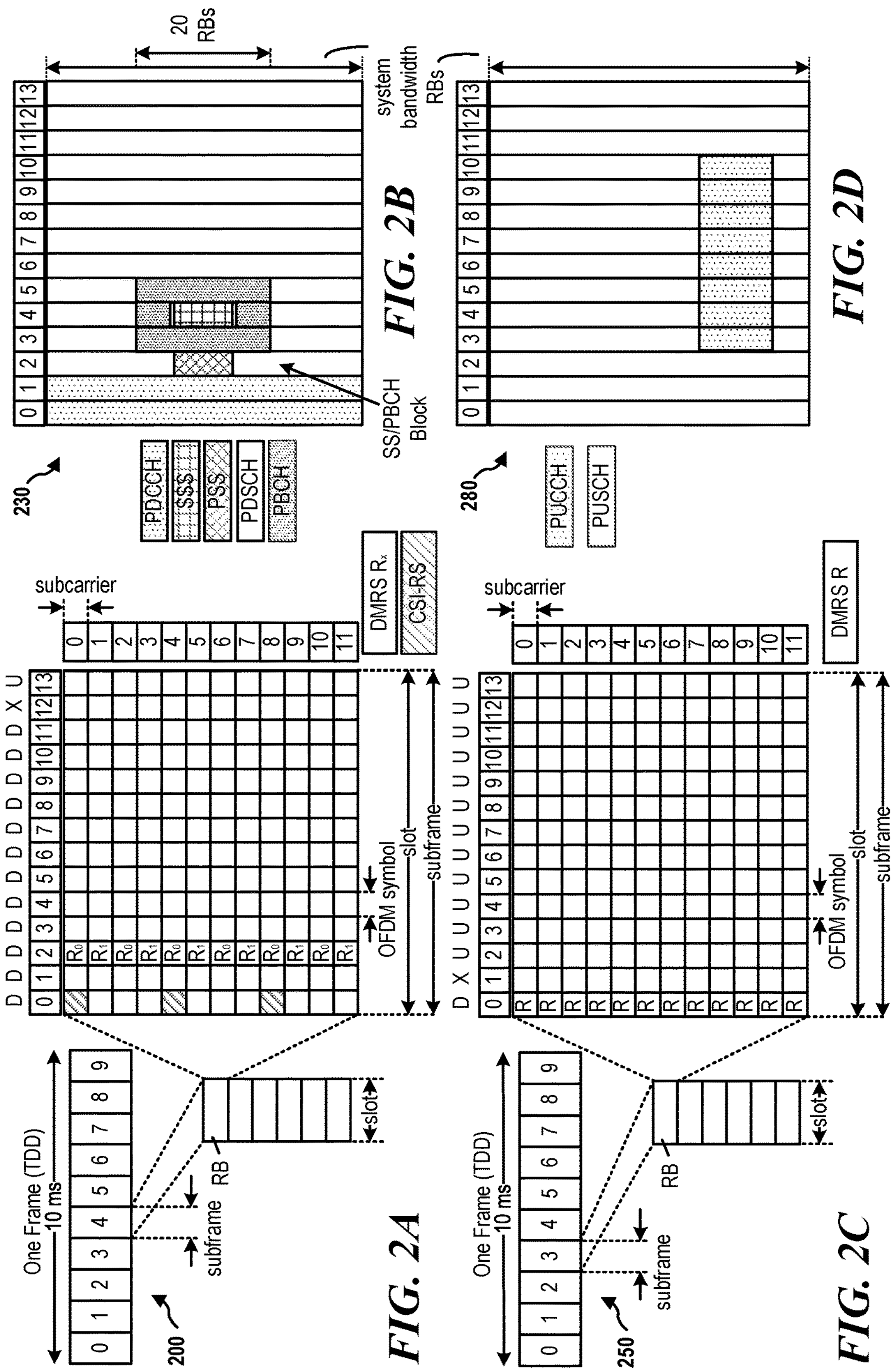
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which, for a particular set of subcarriers (carrier system bandwidth), subframes within the set of subcarriers are dedicated for either DL or UL, or may be time division duplex (TDD) in which, for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu*15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries downlink control information (DCI) within one or more control channel elements (CCEs), each CCE including nine resource element groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned demodulation reference signal (DM-RS). The physical broadcast channel (PBCH), which carries a master information block (MIB), may be logically grouped with the PSS and SSS to form a synchronization signal (SS)/PBCH block. The MIB provides a number of resource blocks (RBs) in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The physical uplink control channel (PUCCH) may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement/negative-acknowledgement (ACK/NACK) feedback. The physical uplink shared channel (PUSCH) carries data, and may additionally be used to carry a buffer status report (BSR), a power headroom report (PHR), and/or uplink control information (UCI).

Figure 3:
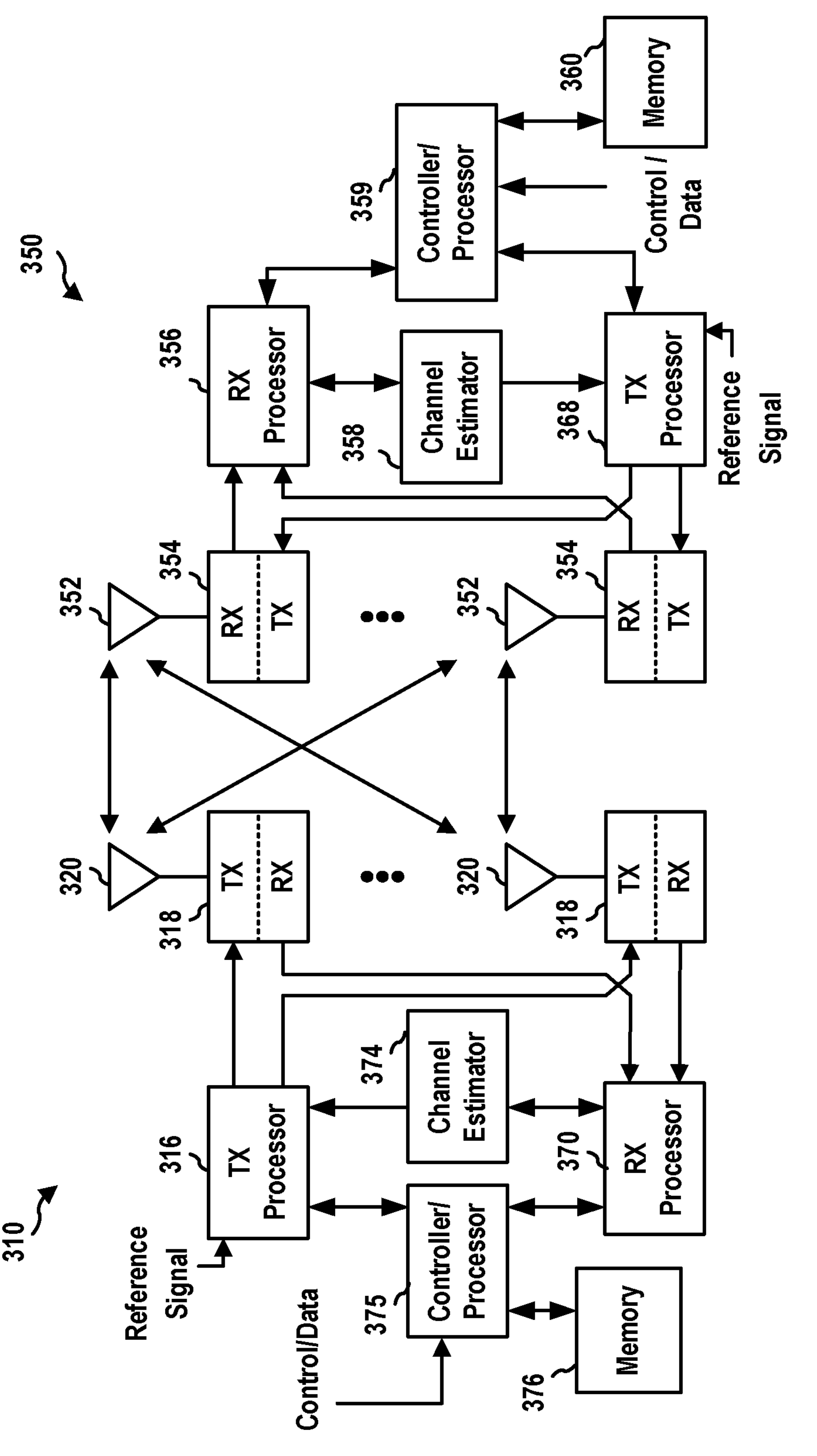
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets from the evolved packet core (EPC) 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from transport blocks (TBs), scheduling information reporting, error correction through hybrid automatic repeat request (HARQ), priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the Voice over Internet Protocol (VoIP) management module 198 of FIG. 1.

Additionally, the VoIP management module 198 may incorporate one or more timers. In some aspects, the UE 350 may include means for attempting a mobile VoIP call across a packet switched network, means for performing a silent redial of the call using a circuit switched network, and means for transmitting a keep alive message over the packet switched network. Such means may include one or more of the components of the UE 350 described with reference to FIG. 3.

Figure 4:
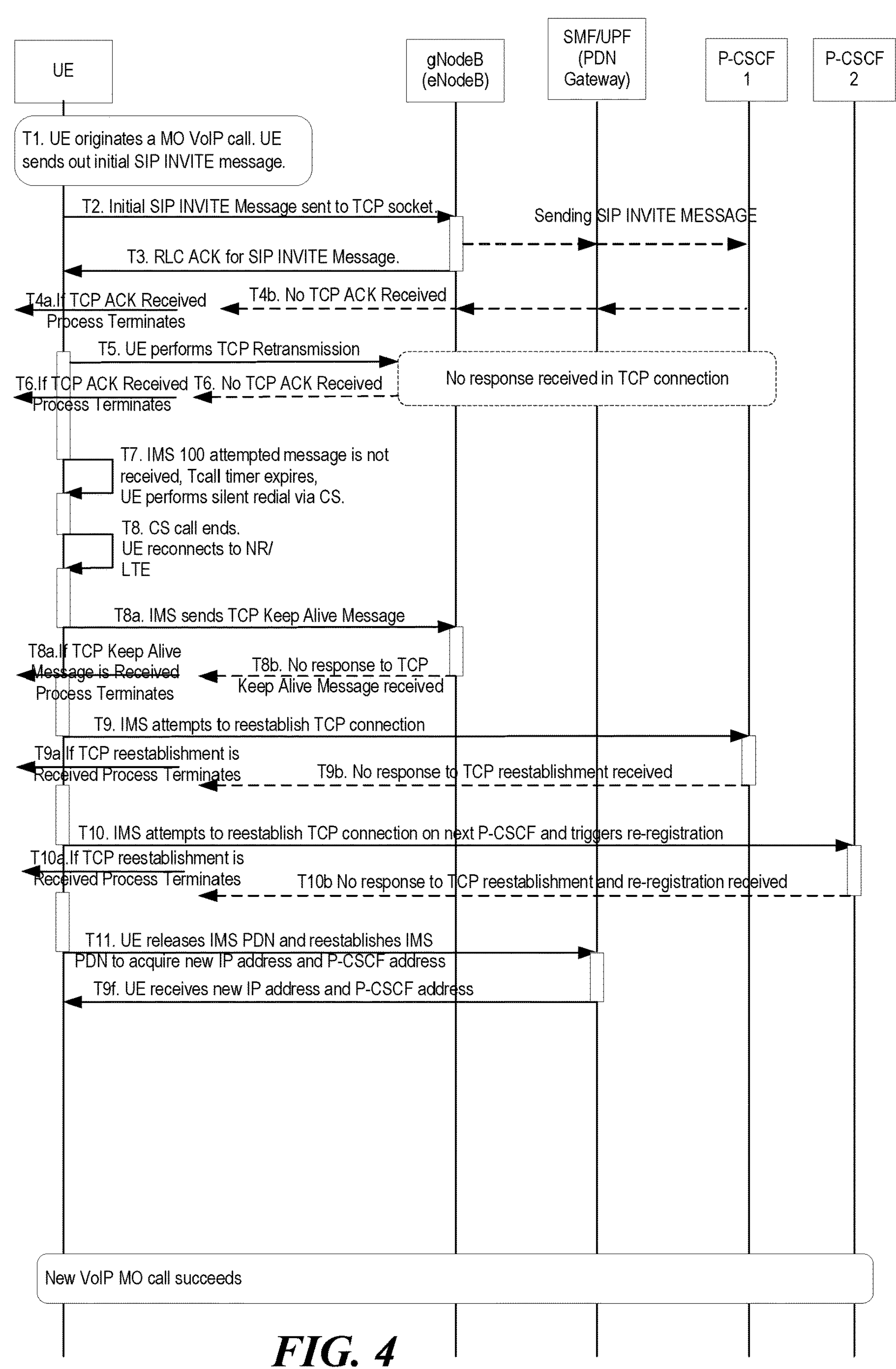
FIG. 4 is a timing diagram illustrating improved voice over internet protocol (VoIP) call setup latency and success rate, in accordance with aspects of the present disclosure.

FIG. 4 is a timing diagram illustrating an example 400 of a VoIP call setup, according to aspects of the present disclosure. In the example 400 of FIG. 4, a UE attempts a VoIP call at time T1. The UE may be an example of a UE 104 or 350 as described in FIGS. 1 and 3, respectively. The call may also be referred to as a mobile-originated (MO) call. To initiate the VoIP call the UE sends an initial SIP invite message to a base station (e.g., gNodeB or eNodeB) at time T1. The base station may be an example of a base station 102 or 310 as described in FIGS. 1 and 3, respectively. At time T2, the initial SIP invite message is written to the TCP socket.

In one implementation, the base station, such as a gNodeB or eNodeB, sends the SIP invite message to a component of a core network, such as the EPC 160 described with reference to FIG. 1. In some examples, the invite message may be transmitted to a core network for forwarding to a first P-CSCF (P-CSCF1). In the current example, the invite message may be transmitted to the user plane function (UPF) of the core network. A heartbeat message may be used to monitor the status of a UPF node in terms of its responsiveness. The heartbeat initiates a bilateral flow of requests and responses between the SMF and UPF. The SMF periodically sends a signal in the form of a heartbeat request to the registered UPF node to determine if it is active. If the SMF does not receive a response from the UPF after the retransmission attempts are exhausted, then SMF recognizes that a failure has occurred and purges the subscribers that are mapped to that UPF node. A PDU session may be created between the UE and a specific data network through the user plane function (UPF). In some examples, the PDU session may be created in an NR end-to-end user plane. The PDU session may support one or more quality of service (QOS) flows. PDU sessions may be applicable for certain wireless networks, such as an NR network. In contrast, other wireless networks, such as a long term evolution (LTE) network, may use an evolved packet system (EPS) bearer to provide end-to-end user plane connectivity between the UE and a base station through a packet gateway (P-GW). If the SIP invite message is successful, a TCP acknowledgement (TCP ACK) may be returned by the P-CSCF1, at a time T3, through a component of the core network and transmitted to the UE via the base station. The process may stop in response to the UE receiving the TCP ACK at time T4a.

In the example of FIG. 4, at time T4b, the UE may fail to receive a TCP ACK message from the P-CSCF1 in response to the initial SIP invite message. In response to the failure to receive the TCP ACK in the TCP connection, the UE performs a TCP retransmission at time T5. The TCP retransmission may follow the same routing from the UE to the base station, as described above for the initial SIP invite message transmitted at time T2. If the TCP ACK is received at time T6a, the process stops and the new VoIP call proceeds. Alternatively, at time T6b, the P-CSCF1 may fail to generate a response to the TCP retransmission. As a result, in such an example, the UE may fail to receive a TCP ACK at time T6c and the process continues at time T7. During this process, from time T5 onward, a transmission call (Tcall) timer, or silent redial timer, is running.

As shown in the example 400 of FIG. 4, at time T7, the IP multimedia subsystem (IMS) has not received a response in the TCP connection. The IMS may re-send the SIP invite message throughout the time allotted by the Tcall timer. A SIP trying message may be sent from the P-CSCF1 to the UE. Once the SIP trying message is received the UE stops the Tcall timer if it has not yet expired. After expiration of the Tcall timer, the UE performs a silent redial to the circuit switched network. Additionally, at time T8, the circuit switched call ends, and the UE reconnects to the NR/LTE or packet switched network.

Additionally, as shown in the example 400 of FIG. 4, at time T8a, the IMS sends a TCP alive message to the base station. In some examples, the VoIP call proceeds if the base station receives TCP keep alive message. The process of FIG. 4 may stop at time T8 upon successful transmission of the TCP keep alive message at time T8a. In such examples, the UE may no longer perform silent redials in response to successfully transmitting the TCP keep alive message. In other examples, the base station may fail to receive the TCP keep alive message, such that the base station does not produce a response at time T8b. In such examples, after a period of time elapses, the IMS proceeds to attempt to re-establish the TCP connection, at time T9 by sending the re-establishment request to the base station. The base station may forward the request to the UPF (PDN gateway) and P-CSCF1. In the current example, the process stops if the re-establishment of the VoIP call is successful and the new VoIP call may proceed, at time T9a. Alternatively, if the UE fails to receive a response to the TCP re-establishment request at time T9b, the IMS of the UE proceeds to attempt to re-establish the TCP connection on a next, or successive P-CSCF, such as a second P-CSCF (P-CSCF2), at time T10

The re-establishment request at time T10 may be sent from the UE to the base station and from the base station to the core network, which may be an SMF/UPF (PDN gateway). The core network passes the re-establishment request to the P-CSCF2. In the current example 400, the process may stop, at time T1aa, if the re-establishment request transmitted at time T10 results in an established VoIP call. Alternatively, if the UE fails to receive a response to TCP re-registration at time T10b, the UE may release the IMS PDN and proceeds to re-establish the IMS PDN by acquiring a new IP address and a new P-CSCF address from the core network, which may be a SMF/UPF (PDN gateway) at time T11. As shown in the example 400 of FIG. 4, both the new IP address and the new P-CSCF address are received from the core network, which may be a SMF/UPF (PDN gateway) at a time T11a'. The VoIP call may then proceed. The process described with reference to FIG. 4 may improve the user experience as the repeated silent redials cease and the VoIP call is established with less latency and an improved success rate.

Further refinements may be specified for use with differing network types. For example, the IMS session may be a packet data network (PDN) session or a protocol data unit (PDU) session. In addition, the packet switched network may be a new radio (NR) network or a long-term evolution (LTE) network. Other refinements may provide for the keep alive message to sync the TCP connection status between a UE and a first P-CPCF.

Figure 5:
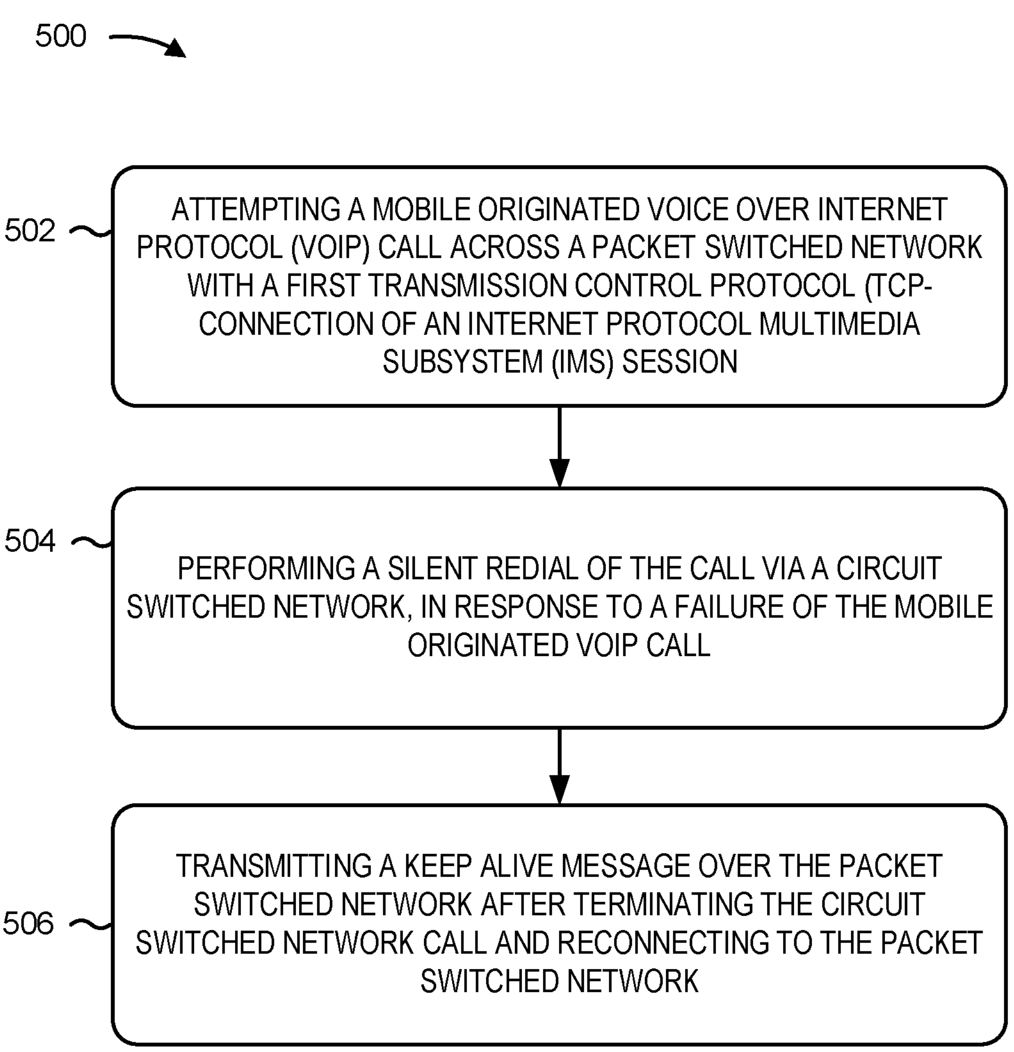
FIG. 5 is a flow diagram of a method of wireless communication, in accordance with aspects of the present disclosure.

FIG. 5 is a flowchart illustrating an example process 500 for wireless communication that supports improving VoIP call setup latency and success rate, according to aspects of the present disclosure. In some implementations, the process 500 may be performed by a wireless communication device operating as or within a UE, such as one of the UEs 104 or 350 described above with respect to FIGS. 1 and 3, respectively.

As shown in FIG. 5, the process 500 may begin in block 502 with the UE (e.g., using the antenna 352, TX 354, transmit processor 368, controller/processor 359, memory 360, and or the like) attempting a mobile originated voice over Internet Protocol (VoIP) call across a packet-switched network with a first transmission control protocol (TCP) connection of an Internet Protocol multimedia subsystem (IMS) session. The packet switched network may be a new radio (NR) network or a long-term evolution network (LTE). The attempt may include a first TCP message transmitted to a first proxy call session control function (P-CSCF) to attempt to re-establish the first TCP connection with the first P-CSCF, in response to a first timer expiring before receiving a response to the keep alive message. Additionally, in block 504, the process 500 continues with the UE (e.g., using the antenna 352, TX 354, transmit processor 368, controller/processor 359, memory 360, and/or the like) performing a silent redial of the call via a circuit switched network, in response to a failure of the mobile originated VoIP call. In block 506, the process 500 proceeds with the UE (e.g., using the antenna 352, TX 354, transmit processor 368, controller/processor 359, memory 360, and/or the like) transmitting a keep alive message over the packet switched network after terminating the circuit switched network call and reconnecting to the packet switched network. A second TCP message may also be sent to a second P-CSCF in response to a second timer expiring before receiving a response to the first TCP message. The second TCP message is sent to attempt to re-establish the first TCP connection with the second P-CSCF and also attempt to register the UE with the second P-CSCF. The attempts may continue with the UE releasing the IMS session and then re-establishing the IMS session in response to a timeout for all assigned P-CSCFs. Once the UE re-established the IMS session the UE acquires a new IP address from the IMS session and also acquires an address of a third P-CSCF from the IMS session. The IMS session may be a packet data network (PDN) session or a protocol data unit (PDU) session. Additional embodiments provide for the keep alive message to sync the TCP connection status between the UE and the first P-CSCF.

As indicated above FIGS. 4 and 5 are provided as examples. Other examples may differ from what is described with respect to FIGS. 4 and 5.

Implementation examples are described in the following numbered clauses.

1. A method of wireless communication performed by a user equipment (UE), comprising:
   attempting a mobile originated packet switched call across a packet switched network with a first transmission control protocol (TCP) connection of an Internet Protocol multimedia subsystem (IMS) session;
   performing a silent redial of the mobile originated packet switched call via a circuit switched network, in response to a failure of the mobile originated packet switched call; and
   transmitting a keep alive message over the packet switched network after terminating the circuit switched network call and reconnecting to the packet switched network.
2. The method of clause 1, further comprising transmitting a first TCP message to a first proxy call session control function (P-CSCF) to attempt to re-establish the first TCP connection with the first P-CSCF, in response to a first timer expiring before receiving a response to the keep alive message.
3. The method of any of clauses 1-2, further comprising transmitting a second TCP message to a second P-CSCF in response to a second timer expiring before receiving a response to the first TCP message, the second TCP message attempting to re-establish the first TCP connection with the second P-CSCF and attempting to register with the second P-CSCF.
4. The method of any of the preceding clauses, further comprising releasing the IMS session and re-establishing the IMS session in response to a third timer expiring before receiving a response to the second TCP message.
5. The method of any of the preceding clauses, further comprising:
   acquiring a new IP address from the IMS session after re-establishing the IMS session; and
   acquiring an address of a third P-CSCF from the IMS session, after re-establishing the IMS session.
6. The method of any of clauses 1-5, wherein the IMS session is a packet data network (PDN) session.
7. The method of any of clauses 1-5, wherein the IMS session is a protocol data unit (PDU) session.
8. The method of clauses 1-7 1, wherein the keep alive message syncs a TCP connection status between the UE and a first proxy call session control function (P-CSCF).
9. The method of clauses 1-7, wherein the packet switched network is a new radio (NR) network.
10. The method of clauses 1-7, wherein the packet switched network is a long-term evolution network (LTE).

The foregoing disclosure provides illustration and description, but is not intended to be exhaustive or to limit the aspects to the precise form disclosed. Modifications and variations may be made in light of the above disclosure or may be acquired from practice of the aspects. For example, although the description refers to attempting a VoIP call, other types of IP communication are contemplated.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used.

Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

attempting a mobile originated packet switched call across a packet switched network with a first transmission control protocol (TCP) connection of an Internet Protocol multimedia subsystem (IMS) session;

performing a silent redial of the mobile originated packet switched call via a circuit switched network, in response to a failure of the mobile originated packet switched call;

reconnecting to the packet switched network without re-establishing the first TCP connection after terminating the circuit switched network call;

transmitting a keep alive message over the packet switched network in accordance with reconnecting to the packet switched network;

transmitting a first TCP message to a first proxy call session control function (P-CSCF) to attempt to re-establish the first TCP connection with the first P-CSCF, in response to a first timer expiring before receiving a response to the keep alive message;

transmitting a second TCP message to a second P-CSCF in response to a second timer expiring before receiving a response to the first TCP message, the second TCP message attempting to re-establish the first TCP connection with the second P-CSCF and attempting to register with the second P-CSCF; and releasing the IMS session and re-establishing the IMS session in response to a third timer expiring before receiving a response to the second TCP message.

2. The method of claim 1, further comprising:

acquiring a new IP address from the IMS session after re-establishing the IMS session; and acquiring an address of a third P-CSCF from the IMS session, after re-establishing the IMS session.

3. The method of claim 2, wherein the IMS session is a packet data network (PDN) session.

4. The method of claim 2, wherein the IMS session is a protocol data unit (PDU) session.

5. The method of claim 1, wherein the keep alive message syncs a TCP connection status between the UE and the first P-CSCF.

6. The method of claim 1, wherein the packet switched network is a new radio (NR) network.

7. The method of claim 1, wherein the packet switched network is a long-term evolution network (LTE).

8. An apparatus for wireless communication by a user equipment (UE), comprising:

at least one memory;

at least one processor coupled to the at least one memory; and instructions stored in the memory and operable, when executed by the processor, to cause the apparatus:

to attempt a mobile originated voice over Internet Protocol (VoIP) call across a packet switched network with a first transmission control protocol (TCP) connection of an Internet Protocol multimedia subsystem (IMS) session;

to perform a silent redial of the mobile originated packet switched call via a circuit switched network, in response to a failure of the mobile originated packet switched call;

to reconnect to the packet switched network without re-establishing the first TCP connection after terminating the circuit switched network call;

to transmit a keep alive message over the packet switched network in accordance with reconnecting to the packet switched network;

to transmit a first TCP message to a first proxy call session control function (P-CSCF) to attempt to re-establish the first TCP connection with the first P-CSCF, in response to a first timer expiring before receiving a response to the keep alive message;

to transmit a second TCP message to a second P-CSCF in response to a second timer expiring before receiving a response to the first TCP message, the second TCP message attempting to re-establish the first TCP connection with the second P-CSCF and attempting to register with the second P-CSCF; and to release the IMS session and re-establish the IMS session in response to timeout for all assigned P-CSCFs.

9. The apparatus of claim 8, wherein execution of the instructions further cause the apparatus:

to acquire a new IP address from the IMS session after re-establishing the IMS session; and to acquire an address of a third P-CSCF from the IMS session, after re-establishing the IMS session.

10. The apparatus of claim 9, wherein the IMS session is a packet data network (PDN) session.

11. The apparatus of claim 9, wherein the IMS session is a protocol data unit (PDU) session.

12. The apparatus of claim 8, wherein the keep alive message syncs a TCP connection status between the UE and the first P-CSCF.

13. The apparatus of claim 8, wherein the packet switched network is a new radio (NR) network.

14. The apparatus of claim 8, wherein the packet switched network is a long-term evolution (LTE) network.

15. The apparatus of claim 8, wherein the apparatus further comprises:

a voice over Internet Protocol (VoIP) management module configured to communicate with a base station, the packet switched network, and the circuit switched network; and a silent redial timer.

16. An apparatus for wireless communication by a user equipment (UE), comprising:

means for attempting a mobile originated packet switched call across a packet switched network with a first transmission control protocol (TCP) connection of an Internet Protocol multimedia subsystem (IMS) session;

means for performing a silent redial of the mobile originated packet switched call via a circuit switched network, in response to a failure of the mobile originated packet switched call;

means for reconnecting to the packet switched network without re-establishing the first TCP connection after terminating the circuit switched network call;

means for transmitting a keep alive message over the packet switched network in accordance with reconnecting to the packet switched network;

means for transmitting a first TCP message to a first proxy call session control function (P-CSCF) to attempt to re-establish the first TCP connection with the first P-CSCF, in response to a first timer expiring before receiving a response to the keep alive message;

means for transmitting a second TCP message to a second P-CSCF in response to a second timer expiring before receiving a response to the first TCP message, the second TCP message attempting to re-establish the first TCP connection with the second P-CSCF and attempting to register with the second P-CSCF; and means for releasing the IMS session and re-establish the IMS session in response to timeout for all assigned P-CSCFs.

17. The apparatus of claim 16, further comprising:

means for acquiring a new IP address from the IMS session after re-establishing the IMS session; and means for acquiring an address of a third P-CSCF from the IMS session, after re-establishing the IMS session.

18. The apparatus of claim 17, wherein the IMS session is a packet data network (PDN) session.

19. The apparatus of claim 17, wherein the IMS session is a protocol data unit (PDU) session.

20. The apparatus of claim 16, wherein the means for transmitting a keep alive message syncs a TCP connection status between the UE and the first P-CSCF.

21. The apparatus of claim 16, wherein the packet switched network is a new radio (NR) network.

* * * * *